US012811665B2

(12) United States Patent
Osaka et al.

(10) Patent No.: US 12,811,665 B2
(45) Date of Patent: Nov. 24, 2026

(54) WIRELESS COMMUNICATION SYSTEM, WIRELESS COMMUNICATION METHOD, AND WIRELESS DEVICE

(71) Applicant: NTT, Inc., Tokyo (JP)

(72) Inventors: Kazuo Osaka, Musashino (JP); Toshifumi Miyagi, Musashino (JP)

(73) Assignee: NTT, Inc., Tokyo (JP)

(*) Notice: Subject to any disclaimer, the term of this patent is extended or adjusted under 35 U.S.C. 154(b) by 222 days.

(21) Appl. No.: 18/726,189

(22) PCT Filed: Jan. 19, 2022

(86) PCT No.: PCT/JP2022/001806
§ 371 (c)(1),
(2) Date: Jul. 2, 2024

(87) PCT Pub. No.: WO2023/139696
PCT Pub. Date: Jul. 27, 2023

(65) Prior Publication Data

US 2025/0158697 A1 May 15, 2025

(51) Int. Cl.
*H04B 7/12* (2006.01)
*H04L 1/00* (2006.01)

(52) U.S. Cl.
CPC ............. *H04B 7/12* (2013.01); *H04L 1/0043* (2013.01)

(58) Field of Classification Search
CPC ................................ H04B 7/12; H04L 1/0043
(Continued)

(56) References Cited

U.S. PATENT DOCUMENTS 8,194,729 B2 * 6/2012 Kim ........................ H04N 19/31 375/240
2006/0116079 A1 * 6/2006 Fukushima ......... H04W 52/245 455/67.11
(Continued)

FOREIGN PATENT DOCUMENTS

WO 2007/108473 A1 9/2007

OTHER PUBLICATIONS

"Research and study on the construction of a wireless access system suitable for medium-to long-distance radio wave propagation over the ocean on remote islands, etc", Japanese Ministry of Internal Affairs and Communications and Kyushu General Communication Station, Report of "2008 Investigative Committee" (main body), Mar. 2009, 314 pages including English Translation.

*Primary Examiner* — Kevin M Burd
(74) *Attorney, Agent, or Firm* — XSENSUS LLP

(57) ABSTRACT

According to an embodiment, there is provided a wireless communication system that transmits data from a transmission device to a reception device by using a plurality of frequency channels, in which the transmission device includes a transfer control unit that performs transfer control to transfer a part of traffic of one or more frequency channels in which a BER reaches a predetermined value to one or more other frequency channels in which a BER does not reach the predetermined value, and a reduction control unit that performs, for traffic remaining after the transfer control unit transfers a part of traffic of the frequency channels in which a BER reaches the predetermined value, reduction control to reduce at least one of a multi-level number of multi-level modulation or a coding rate.

8 Claims, 11 Drawing Sheets

(58) Field of Classification Search
USPC .......................................................... 375/267
See application file for complete search history.

(56) References Cited

U.S. PATENT DOCUMENTS

2008/0316099 A1* 12/2008 Fujii .................... H04B 7/0452
342/373
2009/0168711 A1 7/2009 Fukuoka et al.

* cited by examiner (a)

(b)

(c)

(a)

(b)

(c)

WIRELESS COMMUNICATION SYSTEM, WIRELESS COMMUNICATION METHOD, AND WIRELESS DEVICE

CROSS-REFERENCE TO RELATED APPLICATION

The present application is based on PCT filing PCT/JP2022/001806, filed Jan. 19, 2022, the entire contents of which is incorporated herein by reference.

TECHNICAL FIELD

The present invention relates to a wireless communication system, a wireless communication method, and a wireless device.

BACKGROUND ART

In a wireless communication system that performs microwave communication or the like, it is necessary to reduce an influence of radio wave interference or fading. As a technique for reducing an influence of radio wave interference or fading, for example, space diversity, polarization diversity, frequency diversity, or the like is known.

For example, Non Patent Literature 1 discloses a configuration of space diversity and an effect of polarization diversity that are for constructing a wireless access system suitable for medium/long distance marine radio wave propagation on remote islands or the like.

CITATION LIST

Non Patent Literature

Non Patent Literature 1: "Rito-to no naka chokyori kaijo denpan ni tekishita musen akusesu shisutemu kochiku no tame no chosa kento hokoku-sho (in Japanese) (Report of Investigation and Examination for Constructing Wireless Access System Suitable for Medium/Long Distance Marine Propagation on Remote Islands and the like", Japanese Ministry of Internal Affairs and Communications and Kyushu General Communication Station, Report of "2008 Investigative Committee" (main body), March 2009

SUMMARY OF INVENTION

Technical Problem

However, in the technique described in Non Patent Literature 1, a plurality of wireless facilities (antennas, waveguides, demultiplexers, receivers, and the like) are required to configure diversity. In addition, in a case where frequency diversity is performed, a frequency channel of a redundant system that is a switching destination is required, and an influence of fading or the like cannot be reduced in a case where a bit error simultaneously occurs in a plurality of frequency channels.

The present invention has been made in view of the above-described problems, and an object of the present invention is to provide a wireless communication system, a wireless communication method, and a wireless device capable of efficiently reducing a bit error of traffic even in a case where radio wave interference, fading, or the like occurs.

Solution to Problem

According to an aspect of the present invention, there is provided a wireless communication system that transmits data from a transmission device to a reception device by using a plurality of frequency channels, in which the transmission device includes a transfer control unit that performs transfer control to transfer a part of traffic of one or more frequency channels in which a BER reaches a predetermined value to one or more other frequency channels in which a BER does not reach the predetermined value, and a reduction control unit that performs, for traffic remaining after the transfer control unit transfers a part of traffic of the frequency channels in which a BER reaches the predetermined value, reduction control to reduce at least one of a multi-level number of multi-level modulation or a coding rate.

Further, according to another aspect of the present invention, there is provided a wireless communication method that transmits data from a transmission device to a reception device by using a plurality of frequency channels, the method including: a transfer control step of performing transfer control to transfer a part of traffic of one or more frequency channels in which a BER reaches a predetermined value to one or more other frequency channels in which a BER does not reach the predetermined value; and a reduction control step of performing, for traffic remaining after a part of traffic of the frequency channels in which a BER reaches the predetermined value is transferred, reduction control to reduce at least one of a multi-level number of multi-level modulation or a coding rate.

Further, according to still another aspect of the present invention, there is provided a wireless device that transmits data by using a plurality of frequency channels, the wireless device including: a transfer control unit that performs transfer control to transfer a part of traffic of one or more frequency channels in which a BER reaches a predetermined value to one or more other frequency channels in which a BER does not reach the predetermined value; and a reduction control unit that performs, for traffic remaining after the transfer control unit transfers a part of traffic of the frequency channels in which a BER reaches the predetermined value, reduction control to reduce at least one of a multi-level number of multi-level modulation or a coding rate.

Advantageous Effects of Invention

According to the present invention, it is possible to efficiently reduce a bit error of traffic even in a case where radio wave interference, fading, or the like occurs.

BRIEF DESCRIPTION OF DRAWINGS

FIG. 5(*b*) is a diagram schematically illustrating each of wireless channels when the transmission device performs transfer control. FIG. 5(*c*) is a diagram schematically illustrating each of wireless channels when the transmission device performs reduction control.

FIG. 6(*b*) is a diagram schematically illustrating each of wireless channels when the transmission device performs transfer control. FIG. 6(*c*) is a diagram schematically illustrating each of wireless channels when the transmission device performs reduction control.

FIG. 9(*b*) is a diagram schematically illustrating each of wireless channels when the transmission device performs transfer control. FIG. 9(*c*) is a diagram schematically illustrating each of wireless channels when the transmission device performs reduction control.

FIG. 10(*b*) is a diagram schematically illustrating each of wireless channels after the transmission device performs transfer control and reduction control.

FIG. 11(*b*) is a diagram schematically illustrating each of wireless channels after the transmission device performs transfer control and reduction control.

DESCRIPTION OF EMBODIMENTS

Figure 1:
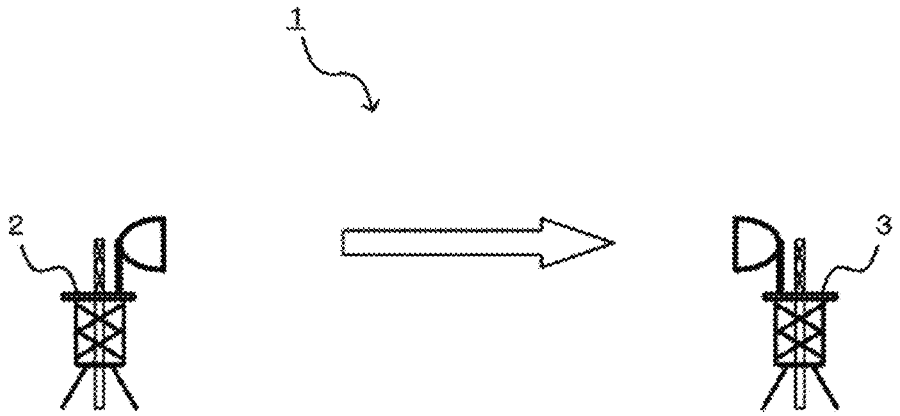
FIG. 1 is a diagram illustrating a configuration example of a wireless communication system according to an embodiment.

Hereinafter, an embodiment of a wireless communication system will be described with reference to the drawings. FIG. 1 is a diagram illustrating a configuration example of a wireless communication system 1 according to the embodiment. As illustrated in FIG. 1, a wireless communication system 1 includes a transmission device 2 and a reception device 3, and the transmission device 2 and the reception device 3 are configured to perform wireless communication such as microwave-band land fixed communication.

For example, the transmission device 2 transmits a plurality of user signals (data) to the reception device 3 using a plurality of frequency channels. It is assumed that the transmission device 2 and the reception device 3 have a function of transmitting and receiving data such as a plurality of user signals to and from each other and can also operate as a relay wireless device (wireless device).

Figure 2:
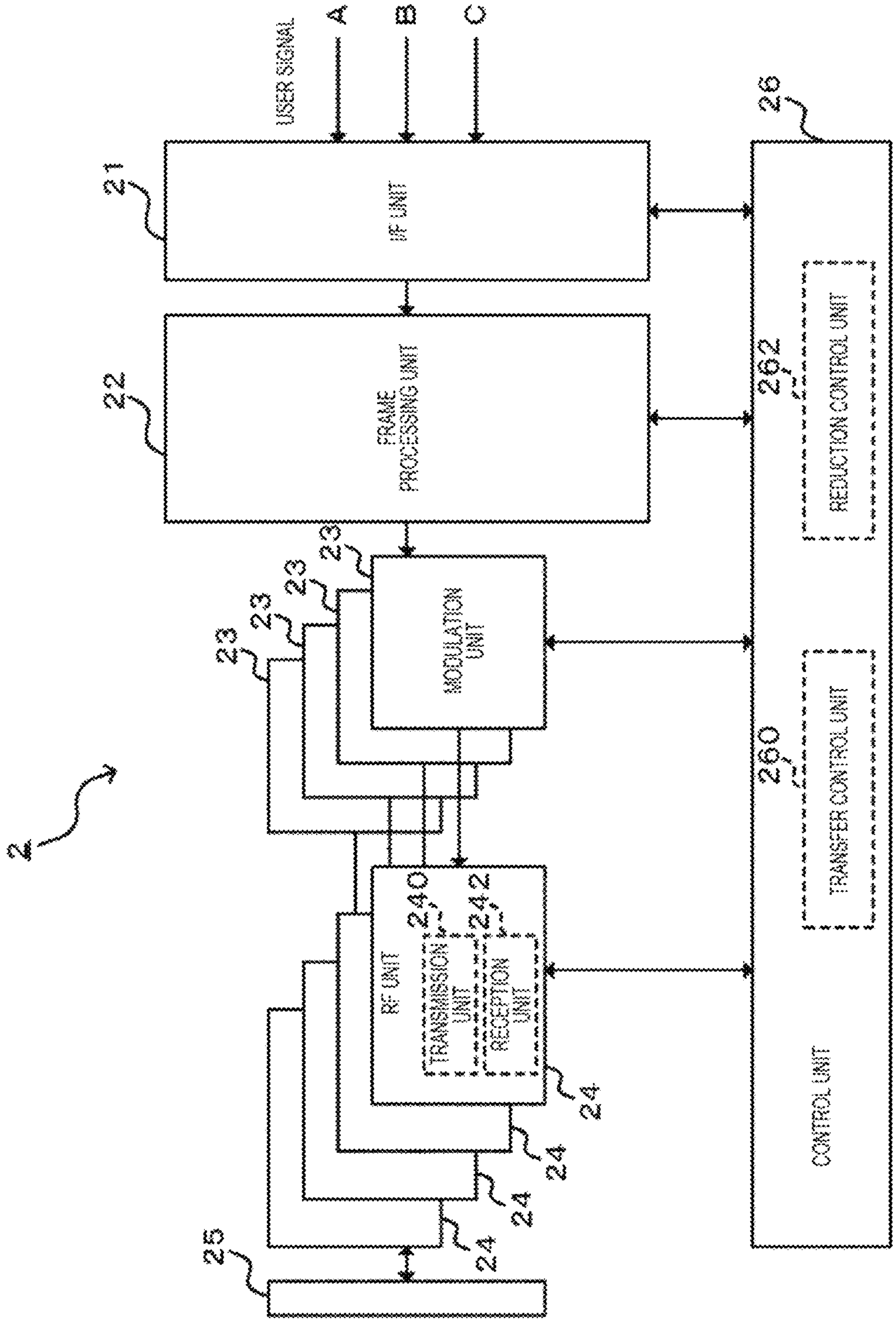
FIG. 2 is a functional block diagram illustrating functions of a transmission device according to the embodiment.

FIG. 2 is a functional block diagram illustrating functions of the transmission device 2 according to the embodiment. As illustrated in FIG. 2, the transmission device 2 includes, for example, an interface (I/F) unit 21, a frame processing unit 22, four modulation units 23 corresponding to frequency channels, four radio frequency (RF) units 24 corresponding to frequency channels, an antenna 25, and a control unit 26.

The I/F unit 21 is, for example, a user interface that acquires three user signals A, B, and C and outputs the user signals A, B, and C to the frame processing unit 22. The user signals A, B, and C are signals output by, for example, three different user terminals (not illustrated), and include data of different categories such as a call, a moving image, a text, a file, and a picture.

The frame processing unit 22 generates a predetermined frame by performing buffering, bit division, mapping, packetization, and the like on the user signals output from the I/F unit 21, and outputs the generated frame to each of the modulation units 23.

Each of the modulation units 23 performs multi-level modulation on the user signal output from the frame processing unit 22 for each of the frequency channels, and outputs the multi-level modulated user signal to the RF unit 24. In addition, each of the modulation units 23 has a function of changing a modulation scheme of the multi-level modulation according to a control of the control unit 26.

Each of the RF units 24 includes a transmission unit 240 and a reception unit 242. The transmission unit 240 transmits the user signal modulated by the modulation unit 23 to the reception device 3 for each of the frequency channels via the antenna 25. The reception unit 242 receives the signal transmitted from the reception device 3 via the antenna 25, and outputs the signal to the control unit 26.

For example, the reception unit 242 receives a bit error rate (BER) transmitted by the reception device 3 to be described later, and outputs the received BER to the control unit 26. In addition, the reception unit 242 receives a carrier-to-noise (CN) ratio (C/N) transmitted by the reception device 3 to be described later, and outputs the received CN ratio to the control unit 26.

The control unit 26 includes, for example, a transfer control unit 260 and a reduction control unit 262, and controls each of the units of the transmission device 2. Further, the control unit 26 performs control for synchronization with the reception device 3.

For example, the transfer control unit 260 performs transfer control to transfer a part of traffic of one or more frequency channels in which the BER of the data transmitted from the transmission device 2 to the reception device 3 reaches a predetermined value to one or more other frequency channels in which the BER does not reach the predetermined value.

At this time, the transfer control unit 260 performs transfer control based on the BER received by the reception unit 242. In addition, in a case where the CN ratio received by the reception unit 242 returns from a value lower than the predetermined value to a value equal to or higher than the predetermined value, the transfer control unit 260 performs control to cancel the transfer control.

The reduction control unit 262 performs, for the traffic remaining after the transfer control unit 260 transfers a part of traffic from the traffic of the frequency channels in which the BER reaches the predetermined value, reduction control to reduce at least one of a multi-level number of multi-level modulation or a coding rate.

For example, the reduction control unit 262 reduces the multi-level number from 64 quadrature amplitude modulation (QAM) to 16 QAM. That is, the control unit 26 can reduce the C/N required for ensuring the BER quality. Thereby, resistance to interference and fading can be improved, and thus the bit error can be reduced.

Further, the reduction control unit 262 can reduce the coding rate. Thereby, error correction can be enhanced, and thus the bit error can be reduced.

The reduction control unit 262 performs reduction control based on the CN ratio received by the reception unit 242. In addition, in a case where the CN ratio received by the reception unit 242 returns from a value lower than the predetermined value to a value equal to or higher than the predetermined value, the reduction control unit 262 performs control to cancel the reduction control.

Figure 3:
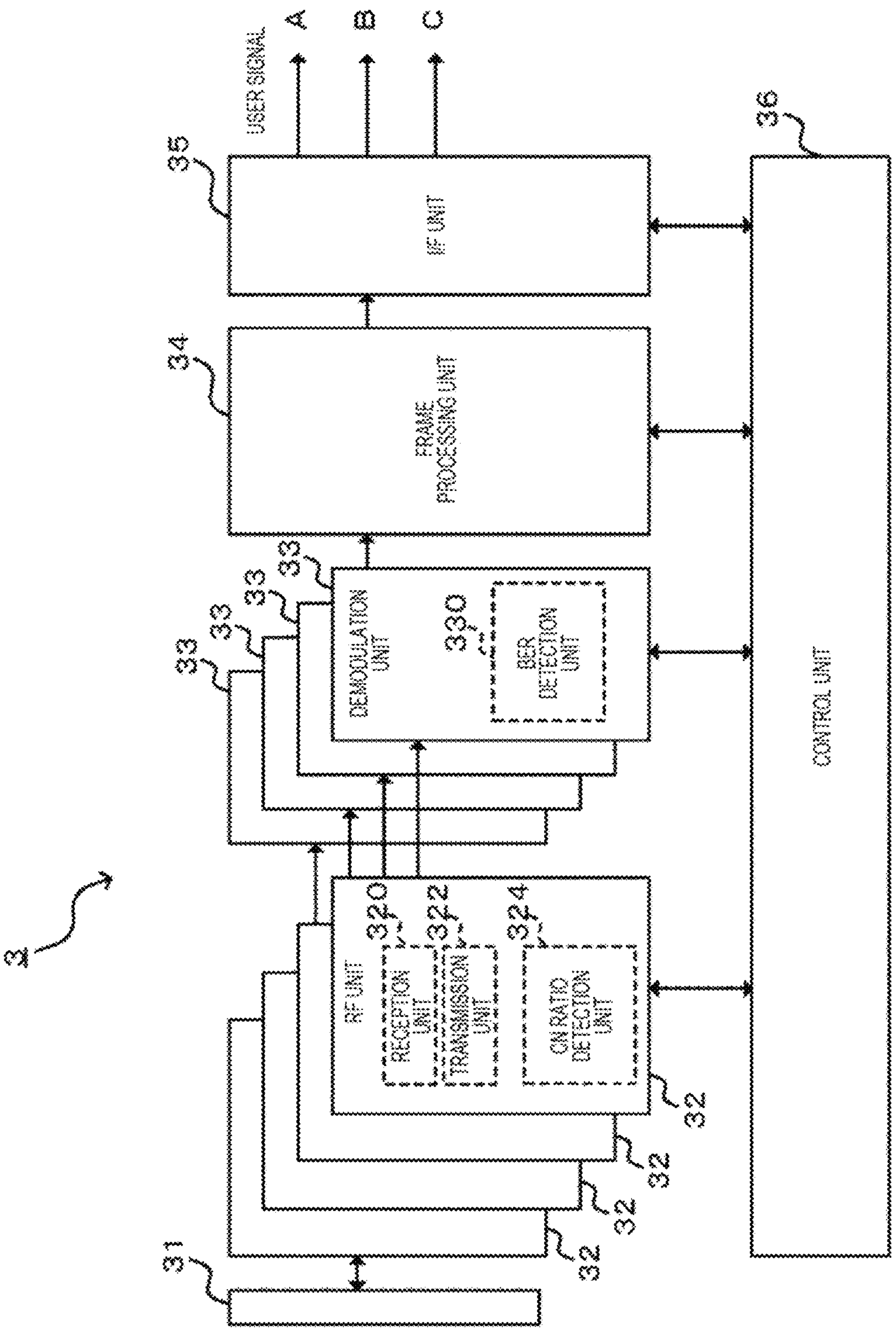
FIG. 3 is a functional block diagram illustrating functions of a reception device.

FIG. 3 is a functional block diagram illustrating functions of the reception device 3. As illustrated in FIG. 3, the reception device 3 includes, for example, an antenna 31, four radio frequency (RF) units 32 respectively corresponding to the frequency channels, four demodulation units 33 respectively corresponding to the frequency channels, a frame processing unit 34, an interface (I/F) unit 35, and a control unit 36.

Each of the RF units 32 includes, for example, a reception unit 320, a transmission unit 322, and a CN ratio detection unit 324.

The reception unit 320 receives each of the plurality of user signals transmitted by the transmission device 2 for each of the frequency channels via the antenna 31, and outputs the received user signal to the demodulation unit 33. Further, the reception unit 320 outputs the signal transmitted by the transmission device 2 to the control unit 36.

The transmission unit 322 transmits a signal (data) to the transmission device 2 via the antenna 31. For example, the transmission unit 322 transmits the CN ratio (to be described later) detected by the CN ratio detection unit 324 and the BER detected by a BER detection unit 330 to be described later to the transmission device 2.

The CN ratio detection unit 324 detects a CN ratio of each of the plurality of frequency channels from the signal transmitted from the transmission device 2 to the reception device 3, and outputs the detected CN ratio to the control unit 36. The control unit 36 outputs the CN ratio detected by the CN ratio detection unit 324 to the transmission unit 322.

Each of the demodulation units 33 includes a BER detection unit 330, demodulates the user signal received by the RF unit 32 for each of the frequency channels, and outputs the demodulated user signal to the frame processing unit 34. The demodulation unit 33 performs demodulation corresponding to the transfer control and the reduction control of the transmission device 2 under a control of the control unit 36.

The BER detection unit 330 detects a BER of each of the plurality of frequency channels from the signal transmitted from the transmission device 2 to the reception device 3, and outputs the detected BER to the control unit 36. The control unit 36 outputs the BER detected by the BER detection unit 330 to the transmission unit 322.

The frame processing unit 34 generates a predetermined frame by performing buffering, bit combination, demapping, and the like on the user signal output from each of the demodulation units 33, and outputs the generated frame to the I/F unit 35.

The I/F unit 35 is a user interface that acquires, for example, three user signals A, B, and C output from the frame processing unit 34 and outputs the user signals A, B, and C to each of the subsequent stages.

The control unit 36 controls each of the units of the reception device 3. In addition, the control unit 36 performs control corresponding to the transfer control and the reduction control performed by the transmission device 2, control for synchronization with the transmission device 2, and the like. That is, the control unit 36 controls processing in which the reception unit 320 receives a signal from the transmission device 2, processing in which the transmission unit 322 transmits a signal to the transmission device 2, and the like.

Some or all of the respective functions of the transmission device 2 and the reception device 3 described above may be configured by hardware such as a programmable logic device (PLD) or a field programmable gate array (FPGA), or may be configured as a program executed by a processor such as a CPU.

For example, the transmission device 2 and the reception device 3 according to the embodiment can be implemented by using a computer and a program, and the program can be provided by being recorded in a storage medium or via a network.

Figure 4:
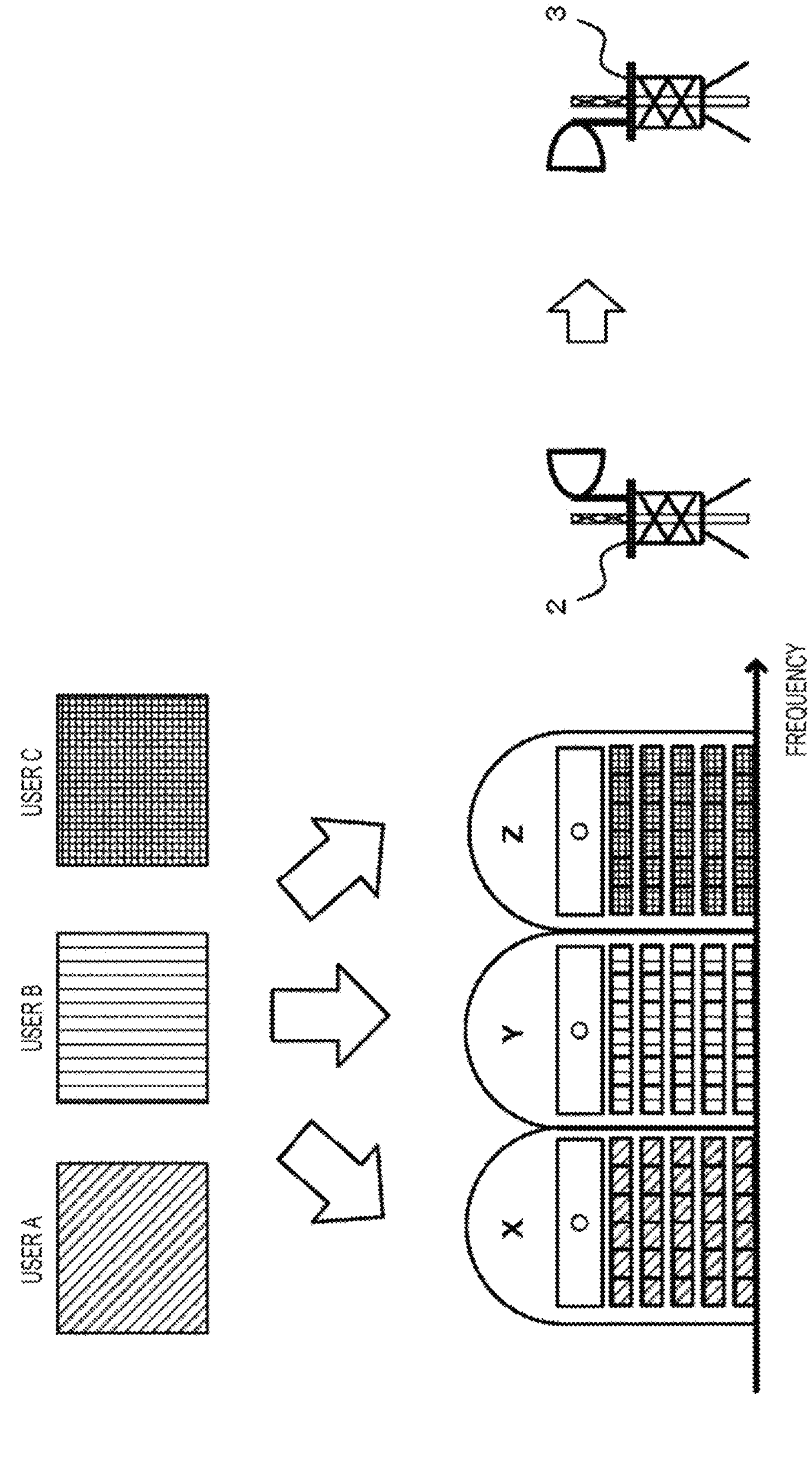
FIG. 4 is a diagram schematically illustrating a plurality of user signals to be transmitted from the transmission device to the reception device.

Next, an operation example of the wireless communication system 1 will be more specifically described. FIG. 4 is a diagram schematically illustrating a plurality of user signals to be transmitted from the transmission device 2 to the reception device 3. The transmission device 2 transmits, for example, user signals of users A, B, and C.

Specifically, for example, the transmission device 2 individually distributes each of the three user signals to each of the three frequency channels X, Y, and Z, and simultaneously transmits the three user signals to the reception device 3. That is, the transmission device 2 individually assigns wireless packets of each of the users to each of the frequency channels X, Y, and Z, and starts data transmission to the reception device 3. At this time, it is assumed that there is free traffic o in each of the frequency channels X, Y, and Z.

Figure 5:
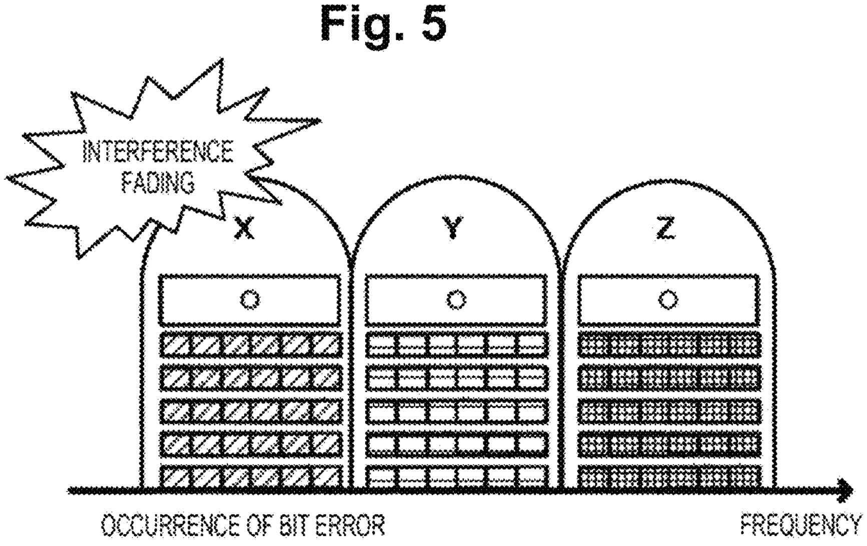
FIG. 5(*a*) is a diagram schematically illustrating each of wireless channels when interference or fading occurs in a frequency channel X after the transmission device starts data transmission.
Figure 5:
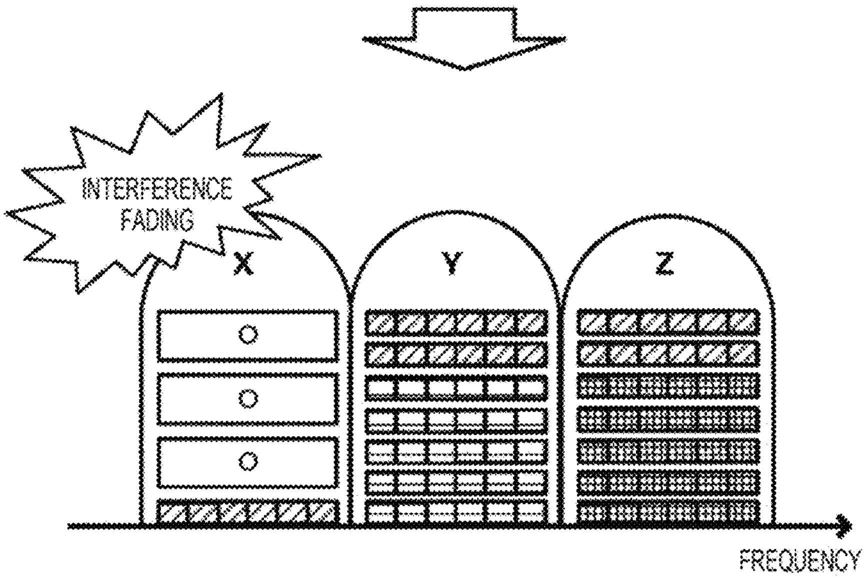
Figure 5:
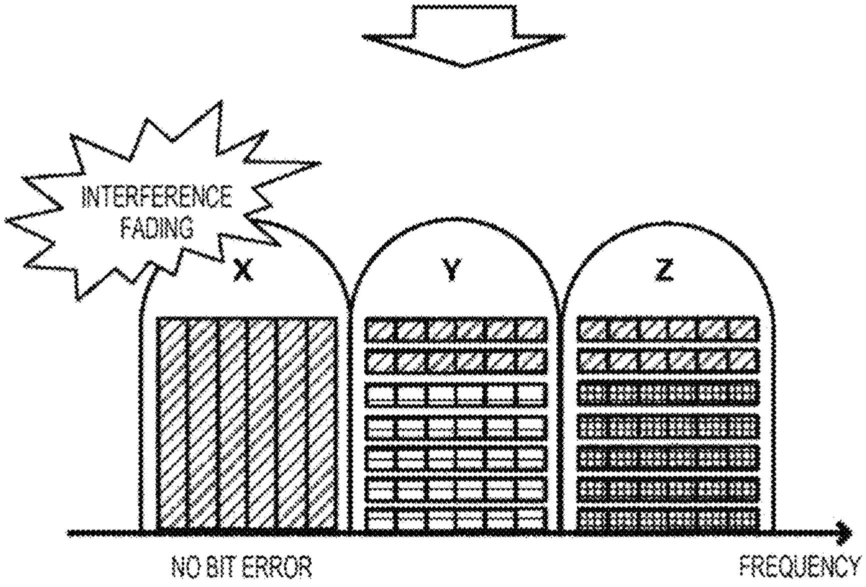

FIG. 5 is a diagram schematically illustrating each of wireless channels in a case where interference or fading occurs in one of the channels when the transmission device 2 transmits data to the reception device 3. FIG. 5(*a*) is a diagram schematically illustrating each of wireless channels when interference or fading occurs in the frequency channel X after the transmission device 2 starts data transmission. FIG. 5(*b*) is a diagram schematically illustrating each of wireless channels when the transmission device 2 performs the transfer control. FIG. 5(*c*) is a diagram schematically illustrating each of wireless channels when the transmission device 2 performs the reduction control.

As illustrated in FIG. 5(*a*), in a case where interference or fading occurs in the frequency channel X after the transmission device 2 starts data transmission, when the transmission device 2 does not perform traffic control, a bit error may occur in the data of the user A that is to be transmitted through the frequency channel X. At this time, no bit error occurs in the data of the user B that is to be transmitted through the frequency channel Y and the data of the user C that is to be transmitted through the frequency channel Z.

First, as illustrated in FIG. 5(*b*), in a case where interference or fading occurs in the frequency channel X, the transmission device 2 performs transfer control to transfer a part of traffic of the user A that is to be transmitted through the frequency channel X to the free traffic O of each of the frequency channels Y and Z (STEP 1).

That is, the transmission device 2 reduces a traffic amount of the frequency channel X by assigning a part of the traffic of the user A that is to be transmitted through the frequency channel X to each of the frequency channels Y and Z.

Next, as illustrated in FIG. 5(*c*), the transmission device 2 performs, for the traffic remaining in the frequency channel X, reduction control to reduce at least one of the multi-level number of the multi-level modulation or the coding rate (STEP 2).

That is, the transmission device 2 can reduce the traffic amount of the frequency channel X. Thereby, even in a case where at least one of the multi-level number of the multi-level modulation or the coding rate is reduced, robust communication can be performed, and thus the bit error can be reduced.

Figure 6:
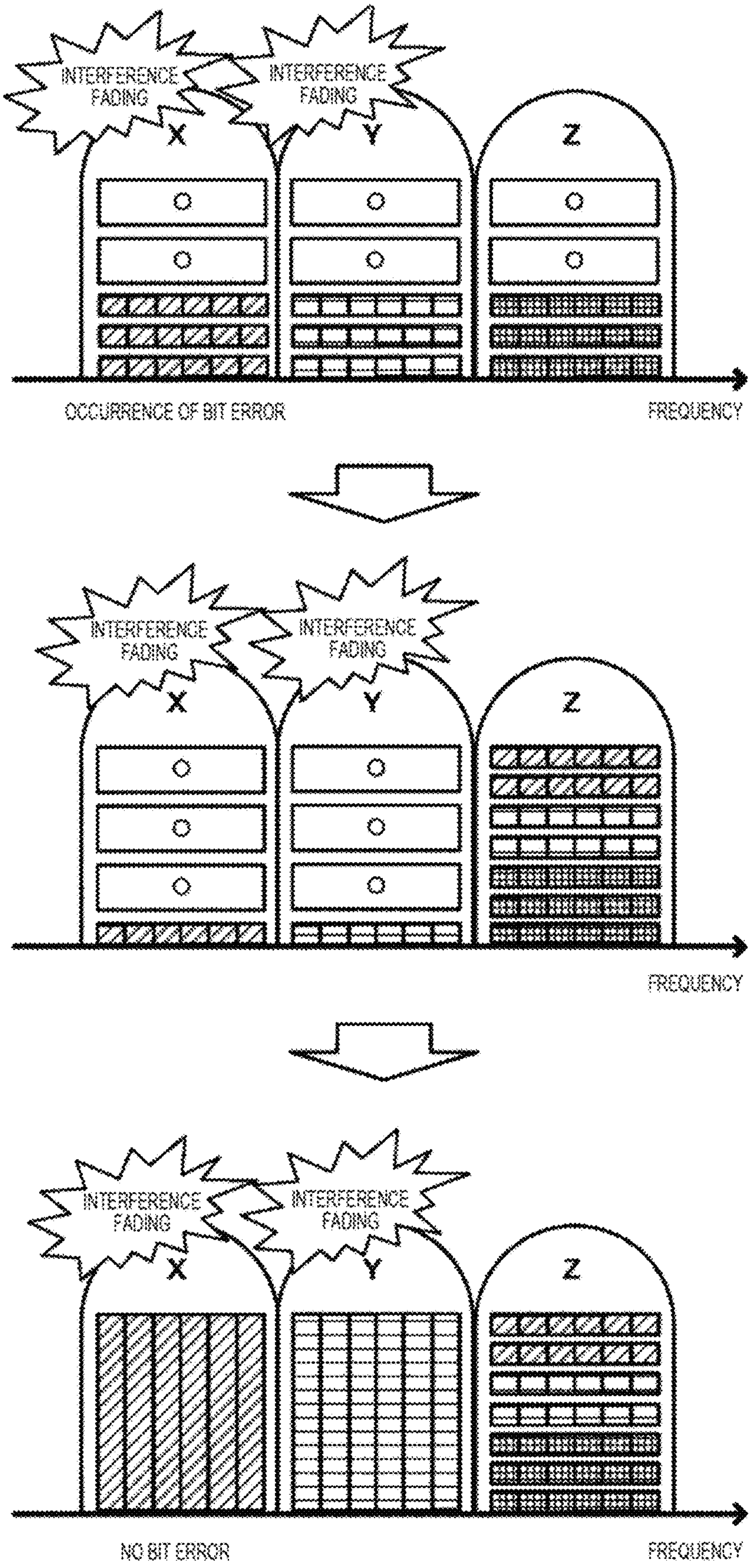
FIG. 6(*a*) is a diagram schematically illustrating each of wireless channels when interference or fading occurs in frequency channels X and Y after the transmission device starts data transmission.

FIG. 6 is a diagram schematically illustrating each of wireless channels in a case where interference or fading simultaneously occurs in a plurality of channels when the transmission device 2 transmits data to the reception device 3. FIG. 6(*a*) is a diagram schematically illustrating each of wireless channels when interference or fading occurs in the frequency channels X and Y after the transmission device 2 starts data transmission. FIG. 6(*b*) is a diagram schematically illustrating each of wireless channels when the transmission device 2 performs the transfer control. FIG. 6(*c*) is a diagram schematically illustrating each of wireless channels when the transmission device 2 performs the reduction control.

As illustrated in FIG. 6(*a*), in a case where interference or fading occurs in the frequency channels X and Y after the transmission device 2 starts data transmission, when the transmission device 2 does not perform traffic control, a bit error may occur in pieces of data of the users A and B that are to be transmitted through the frequency channels X and Y. At this time, no bit error occurs in the data of the user C that is to be transmitted through the frequency channel Z.

First, as illustrated in FIG. 6(*b*), in a case where interference or fading occurs in the frequency channels X and Y, the transmission device 2 performs transfer control to transfer a part of traffic of each of the users A and B that is to be transmitted through the frequency channels X and Y to the free traffic O of the frequency channel Z (STEP 1).

That is, the transmission device 2 reduces a traffic amount of each of the frequency channels X and Y by assigning a part of the traffic of each of the users A and B that is to be transmitted through the frequency channels X and Y to the frequency channel Z.

Next, as illustrated in FIG. 6(*c*), the transmission device 2 performs, for the traffic remaining in each of the frequency channels X and Y, reduction control to reduce at least one of the multi-level number of the multi-level modulation or the coding rate (STEP 2).

That is, the transmission device 2 can reduce the traffic amount of each of the frequency channels X and Y. Thereby, even in a case where at least one of the multi-level number of the multi-level modulation or the coding rate is reduced, robust communication can be performed, and thus the bit error can be reduced.

Figure 7:
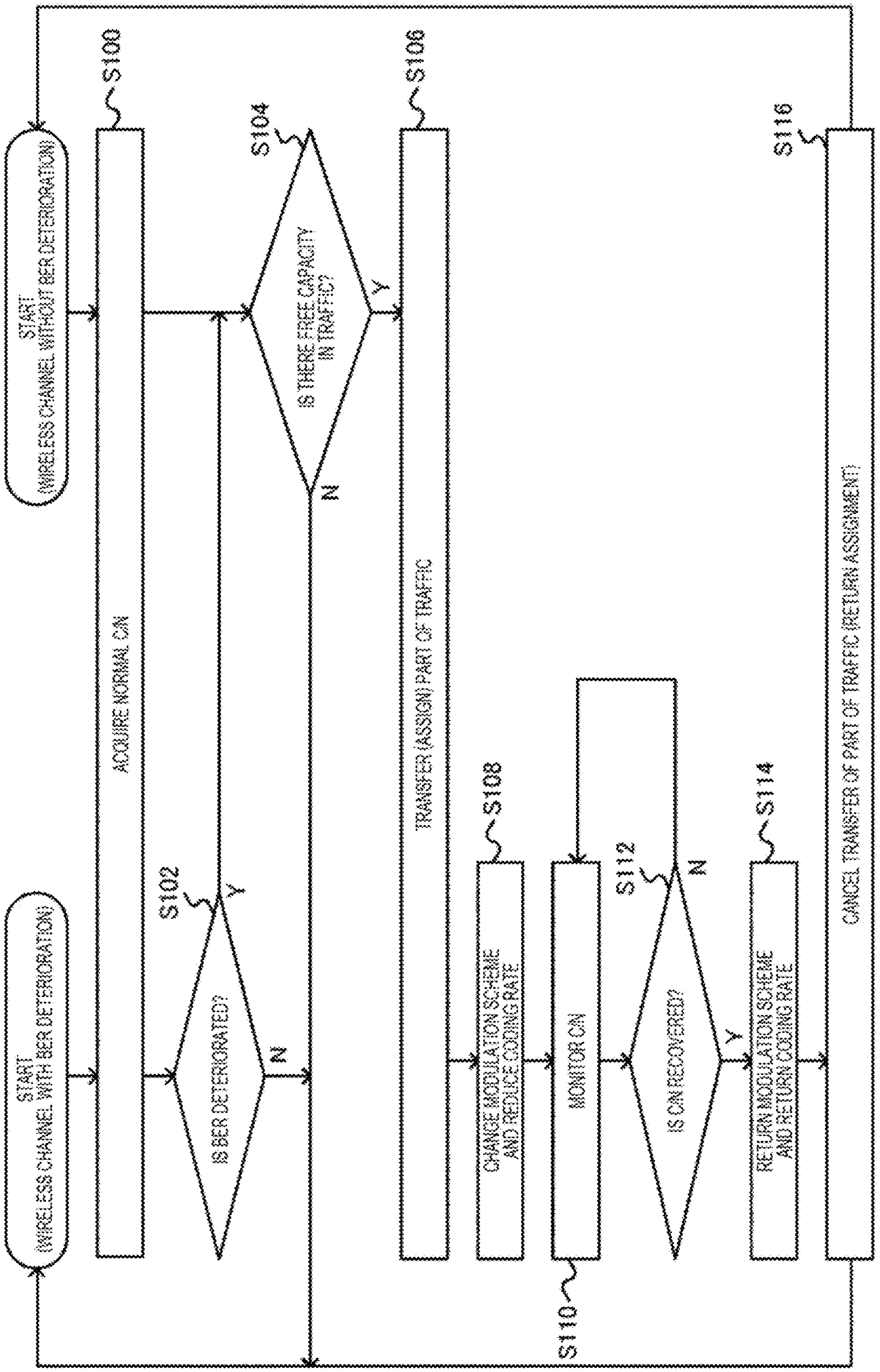
FIG. 7 is a diagram illustrating an operation example of the transmission device according to the embodiment.

FIG. 7 is a diagram illustrating an operation example of the transmission device 2. As illustrated in FIG. 7, the transmission device 2 acquires C/N (normal C/N) in a state where there is no interference or fading in all the wireless channels (S100). Specifically, the transmission device 2 receives C/N of each of all the wireless channels detected by the reception device 3.

In step 102 (S102), the transmission device 2 determines whether or not the BER of any of the wireless channels is deteriorated. In a case where it is determined that the BER is deteriorated (Yes in S102), the transmission device 2 proceeds to processing of S104, and in a case where it is determined that the BER is not deteriorated (No in S102), the transmission device 2 continues processing of S100.

In step 104 (S104), the transmission device 2 determines whether or not there is free capacity in the traffic of the wireless channel without BER deterioration. In a case where it is determined that there is free capacity (Yes in S104), the transmission device 2 proceeds to processing of S106, and in a case where it is determined that there is no free capacity (No in S104), the transmission device 2 continues processing of S100.

In step 106 (S106), the transmission device 2 transfers (assigns) a part of the traffic of the wireless channel (interfered wireless channel) in which interference or fading occurs to a wireless channel without BER deterioration. That is, the transmission device 2 performs transfer control.

In step 108 (S108), the transmission device 2 changes, for the interfered wireless channel, the modulation scheme to a modulation scheme with a smaller multi-level number, and reduces the coding rate. That is, the transmission device 2 performs reduction control.

In step 110 (S110), the transmission device 2 monitors the C/N of each of the wireless channels by receiving the C/N of each of the wireless channels from the reception device 3.

In step 112 (S112), the transmission device 2 determines whether or not the C/N of the wireless channel with BER deterioration is recovered to the normal C/N. In a case where it is determined that the C/N is recovered (Yes in S112), the transmission device 2 proceeds to processing of S114, and in a case where it is determined that the C/N is not recovered (No in S112), the transmission device 2 returns to processing of S110.

In step 114 (S114), the transmission device 2 returns, for the wireless channel in which interference or fading occurs, the modulation scheme and the coding rate to the original modulation scheme and the original coding rate. That is, the transmission device 2 increases the multi-level number of the modulation scheme, and increases the coding rate.

In step 116 (S116), the transmission device 2 cancels the transfer of the part of the traffic of the wireless channel in which interference or fading occurs (returns the assignment).

As described above, in the wireless communication system 1 according to the embodiment, the transmission device 2 performs the transfer control and the reduction control. Thereby, even in a case where radio wave interference, fading, or the like occurs, the bit error of the traffic can be efficiently reduced.

Next, a modification example of the wireless communication system 1 will be described.

In a modification example of the wireless communication system 1, the transmission device 2 may include a division unit that divides each of pieces of data of a plurality of users in units of bits, a distribution processing unit that distributes each of the pieces of data of the plurality of users divided by the division unit such that the pieces of data of the plurality of users are evenly included in each of the plurality of frequency channels, and a transmission unit that transmits the pieces of data of the plurality of users distributed by the distribution processing unit for each of the frequency channels.

Further, in the modification example of the wireless communication system 1, the reception device 3 may include a reception unit that receives the pieces of data of the plurality of users transmitted by the transmission unit of the transmission device 2 for each of the frequency channels, an extraction unit that extracts each of the pieces of data of the plurality of users received by the reception unit from each of the plurality of frequency channels in units of bits, and a reproduction unit that combines and reproduces each of the pieces of data of the plurality of users extracted by the extraction unit for each of the users.

Figure 8:
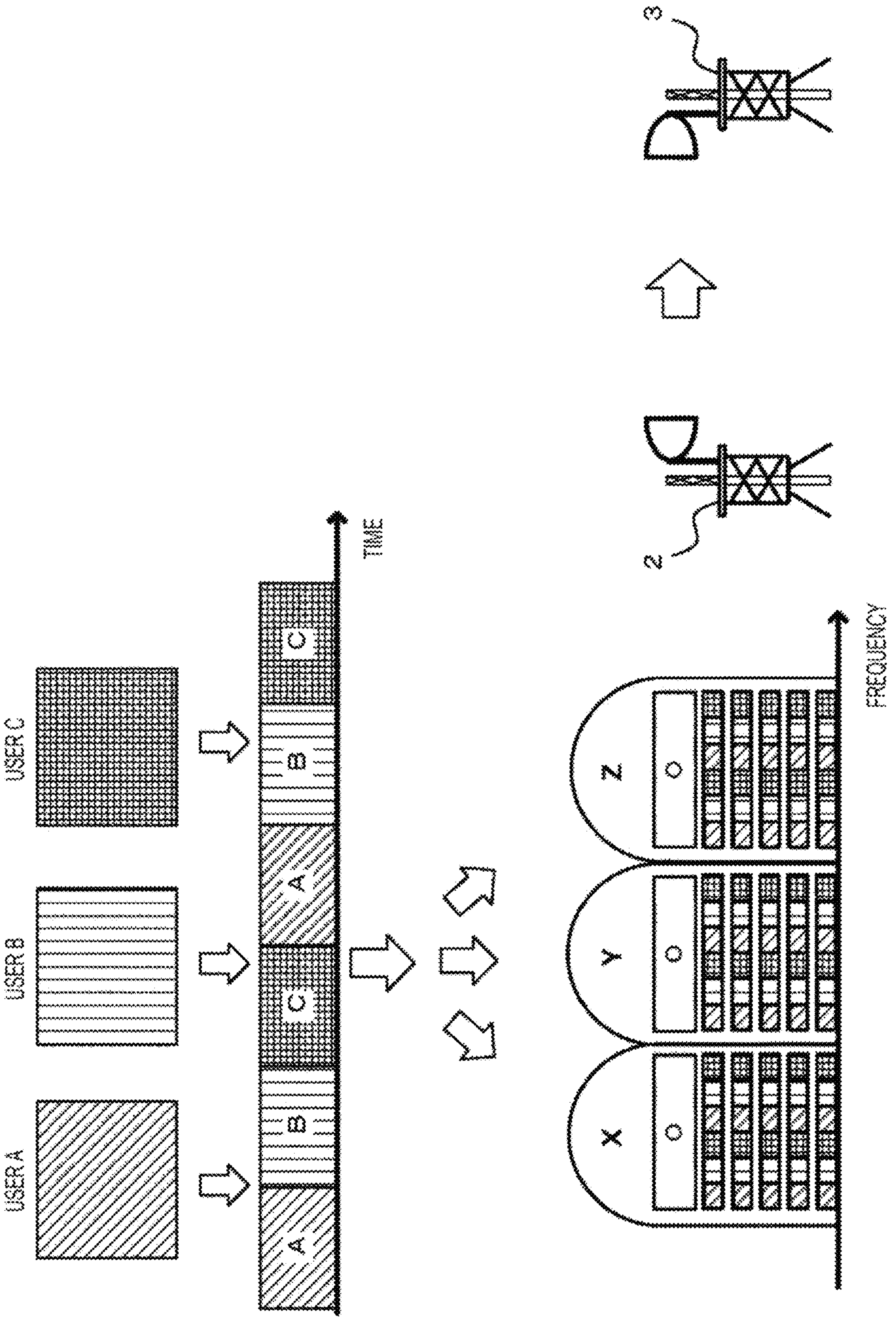
FIG. 8 is a diagram schematically illustrating a plurality of user signals to be transmitted from the transmission device to the reception device in a modification example of the wireless communication system.

FIG. 8 is a diagram schematically illustrating a plurality of user signals to be transmitted from the transmission device 2 to the reception device 3 in the modification example of the wireless communication system 1. For example, the transmission device 2 transmits the user signals of the users A, B, and C by evenly using the frequency channels X, Y, and Z.

Specifically, the transmission device 2 divides the traffic of each of the users A, B, and C in units of bits, sets wireless packets in which the traffic of each of the users A, B, and C is mixed in a time division manner, and evenly distributes the wireless packets to each of the frequency channels X, Y, and Z.

Figure 9:
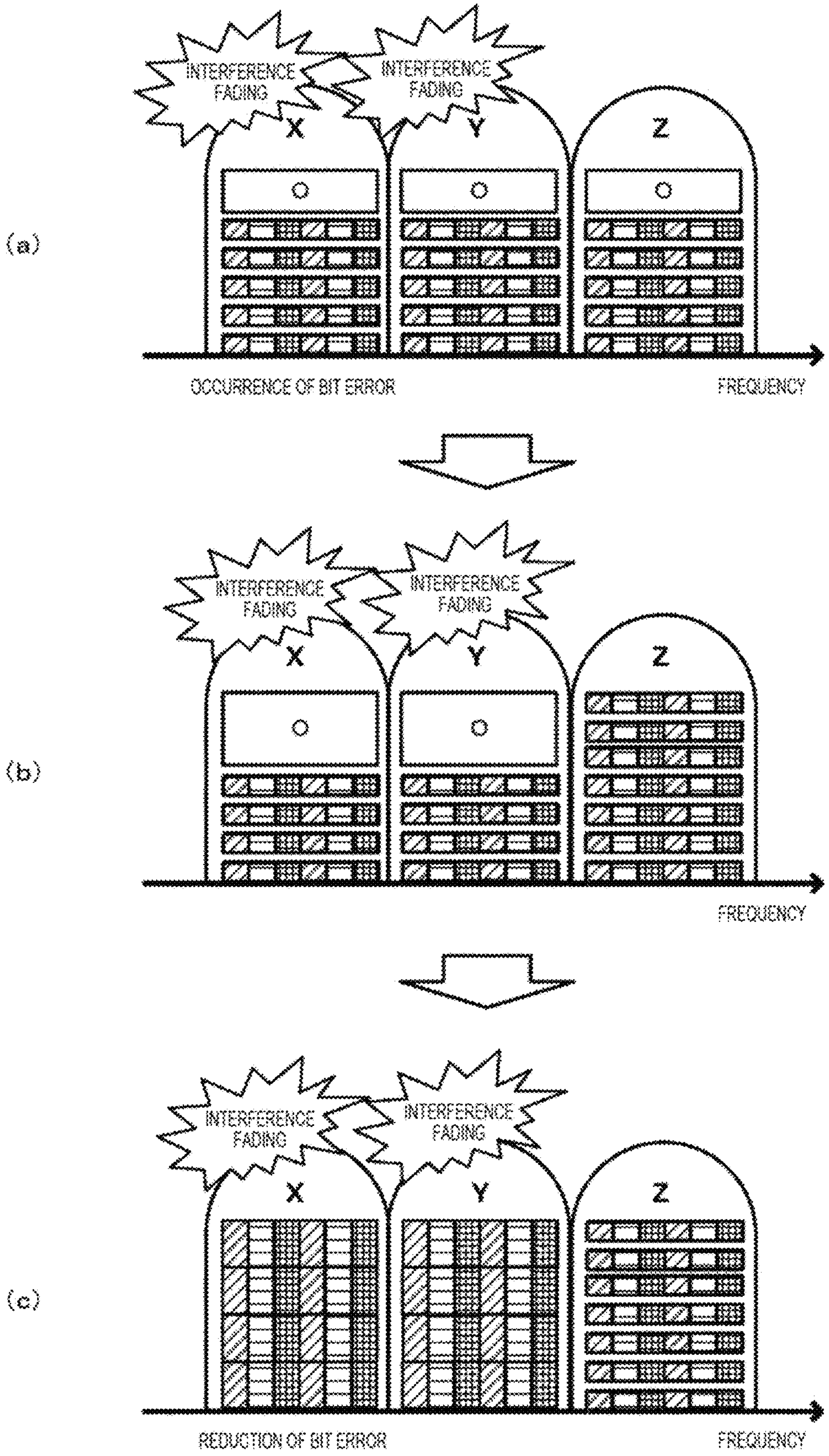
FIG. 9(*a*) is a diagram schematically illustrating each of wireless channels when interference or fading occurs in frequency channels X and Y after the transmission device starts data transmission.

FIG. 9 is a diagram schematically illustrating each of wireless channels in a case where interference or fading simultaneously occurs in a plurality of channels when the transmission device 2 transmits data to the reception device 3 in the modification example of the wireless communication system 1. FIG. 9(*a*) is a diagram schematically illustrating each of wireless channels when interference or fading occurs in the frequency channels X and Y after the transmission device 2 starts data transmission. FIG. 9(*b*) is a diagram schematically illustrating each of wireless channels when the transmission device 2 performs the transfer control. FIG. 9(*c*) is a diagram schematically illustrating each of wireless channels when the transmission device 2 performs the reduction control.

As illustrated in FIG. 9(*a*), in a case where interference or fading occurs in the frequency channels X and Y after the transmission device 2 starts data transmission, when the transmission device 2 does not perform traffic control, a bit error may occur in pieces of data of the users A, B, and C that are to be transmitted through the frequency channels X and Y. At this time, no bit error occurs in pieces of data of the users A, B, and C that are to be transmitted through the frequency channel Z.

First, as illustrated in FIG. 9(*b*), in a case where interference or fading occurs in the frequency channels X and Y, the transmission device 2 performs transfer control to transfer a part of traffic of each of the users A, B, and C that is to be transmitted through the frequency channels X and Y to the free traffic O of the frequency channel Z (STEP 1).

The free traffic O of the frequency channel Z may not have a sufficient capacity to transfer a part of the traffic of each of the users A, B, and C that is to be transmitted through the frequency channels X and Y.

Here, the transmission device 2 reduces a traffic amount of each of the frequency channels X and Y by assigning a part of the traffic of each of the users A, B, and C that is to be transmitted through the frequency channels X and Y to the frequency channel Z.

Next, as illustrated in FIG. 9(*c*), the transmission device 2 performs, for the traffic remaining in each of the frequency channels X and Y, reduction control to reduce at least one of the multi-level number of the multi-level modulation or the coding rate (STEP 2).

The transmission device 2 can reduce the traffic amount of each of the frequency channels X and Y. Thereby, even in a case where at least one of the multi-level number of the multi-level modulation or the coding rate is reduced, robust communication can be performed, and thus the bit error can be reduced.

Next, an effect of reducing the bit error of the traffic by the modification example of the wireless communication system 1 in a case where the capacity of the free traffic of the wireless channel is not sufficient will be described with reference to FIG. 10 and FIG. 11.

Figure 10:
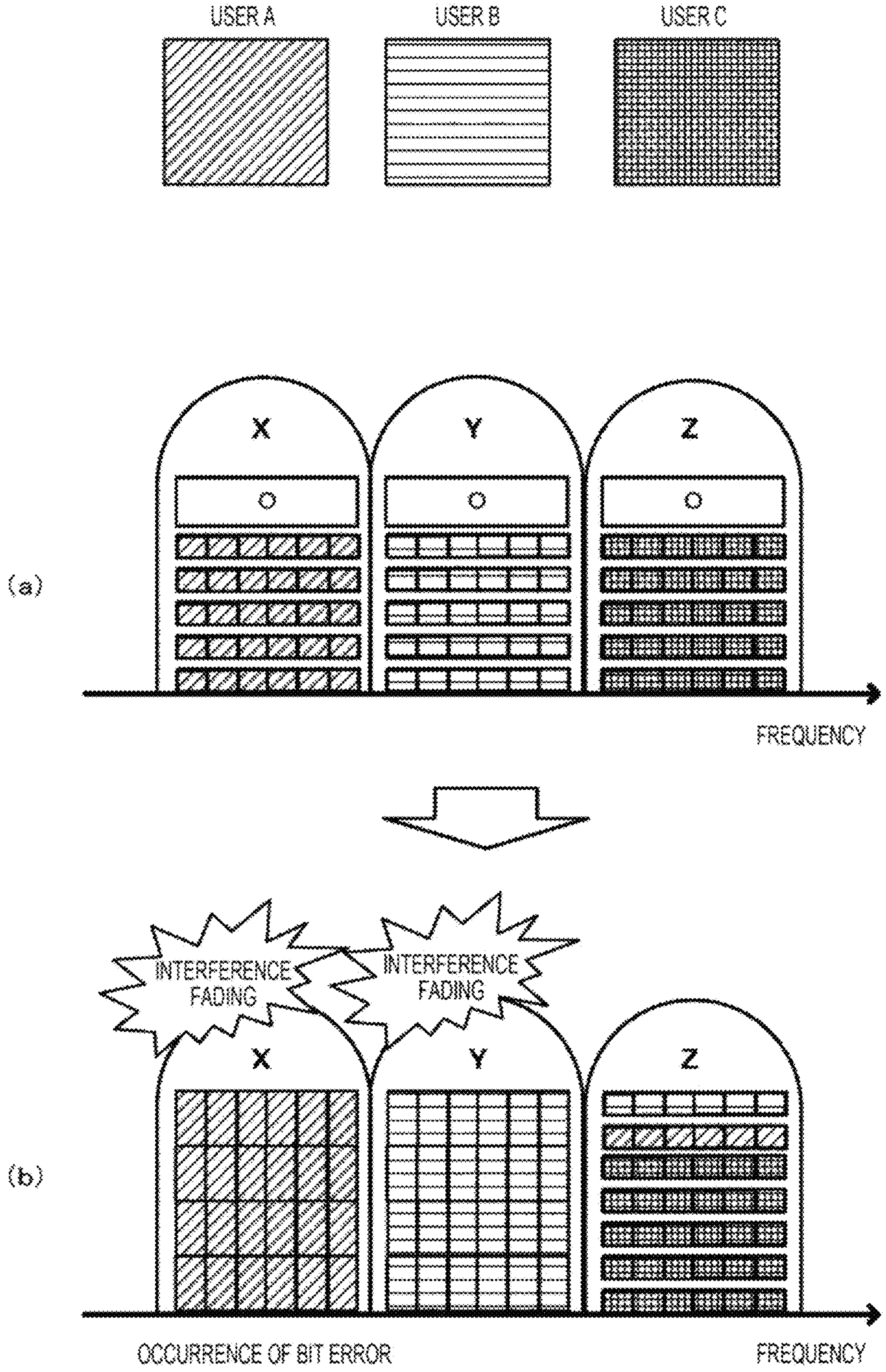
FIG. 10(*a*) is a diagram schematically illustrating a plurality of user signals to be transmitted by the transmission device without dividing traffic of each user.

FIG. 10 is a diagram schematically illustrating each of wireless channels in a case where the transmission device 2 assigns the traffic of each user to the frequency channel without dividing the traffic. FIG. 10(*a*) is a diagram schematically illustrating a plurality of user signals to be transmitted by the transmission device 2 without dividing the traffic of each user. FIG. 10(*b*) is a diagram schematically illustrating each of wireless channels after the transmission device 2 performs the transfer control and the reduction control.

In a case where the capacity of the free traffic of the wireless channel is not sufficient, as illustrated in FIG. 10, when interference or fading occurs in the frequency channels X and Y, the transmission device 2 performs the transfer control and the reduction control. On the other hand, even in this case, a bit error may occur in the data of the user A on the frequency channel X, and a bit error may occur in the data of the user B on the frequency channel Y.

That is, even in a case where the transmission device 2 transfers a part of the traffic to the frequency channel Z after interference or fading occurs in the frequency channels X and Y, when the free traffic O of the frequency channel Z is not sufficient, pieces of data of the users A and B that are to be transmitted through the frequency channels X and Y have more bit errors as compared with the data of the user C that is to be transmitted only through the frequency channel Z.

Figure 11:
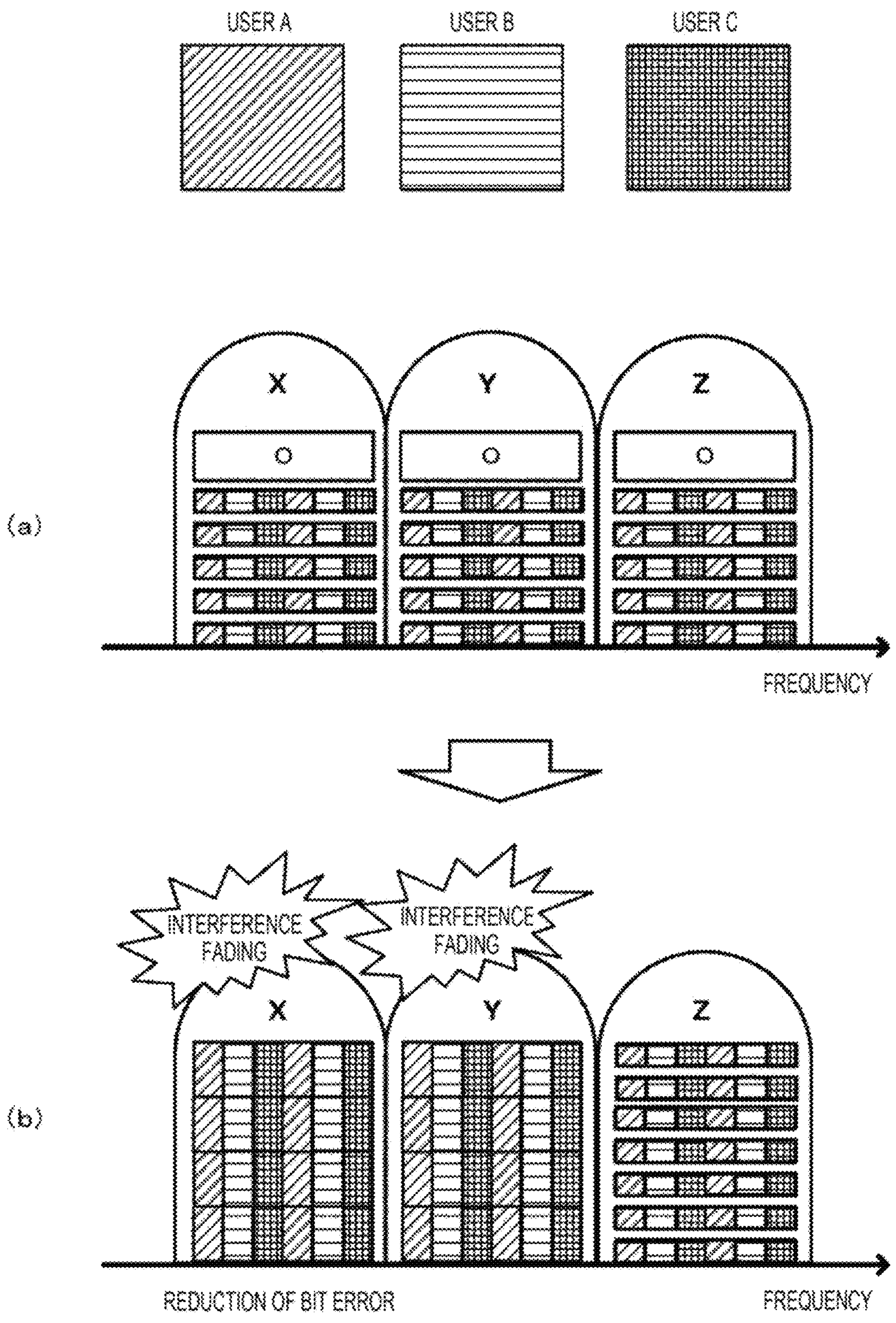
FIG. 11(*a*) is a diagram schematically illustrating a plurality of user signals to be transmitted by the transmission device after dividing traffic of each user.

FIG. 11 is a diagram schematically illustrating each of wireless channels in a case where the transmission device 2 divides the traffic of each user and assigns the divided traffic to each of frequency channels. FIG. 11(*a*) is a diagram schematically illustrating a plurality of user signals to be transmitted by the transmission device 2 after dividing the traffic of each user. FIG. 11(*b*) is a diagram schematically illustrating each of wireless channels after the transmission device 2 performs the transfer control and the reduction control.

As illustrated in FIG. 11, before interference or fading occurs in the frequency channels X and Y, the transmission device 2 divides traffic of each user in advance and evenly distributes the divided traffic to each of the frequency channels. In this case, even when the capacity of the free traffic O is not sufficient in the frequency channel Z or the like that is a transfer destination of the traffic, the transmission device 2 performs the transfer control and the reduction control. Thereby, the bit errors of the plurality of users A, B, and C can be averaged regardless of a degree of the bit error and excess or deficiency of the free traffic.

That is, by dividing the traffic of each user and assigning the divided traffic to each of the frequency channels (FIG. 11), the transmission device 2 can reduce the BERs of the users A and B as compared with a case where the traffic of each user is assigned to the frequency channels without being divided (FIG. 10). That is, the transmission device 2 can reduce the BER per user.

REFERENCE SIGNS LIST

- 1 Wireless communication system
- 2 Transmission device
- 3 Reception device
- 21 I/F unit
- 22 Frame processing unit
- 23 Modulation unit
- 24 RF unit
- 25 Antenna
- 26 Control unit
- 31 Antenna
- 32 RF unit
- 33 Demodulation unit
- 34 Frame processing unit
- 35 I/F unit
- 36 Control unit
- 240 Transmission unit
- 242 Reception unit

260 Transfer control unit
262 Reduction control unit
320 Reception unit
322 Transmission unit
324 CN ratio detection unit
330 BER detection unit

The invention claimed is:

1. A wireless communication system that transmits data from a transmission device to a reception device by using a plurality of frequency channels, wherein the transmission device includes a transfer controller to perform transfer control to transfer only a first part of traffic on one frequency channel of one or more frequency channels in which a bit error rate (BER) reaches a predetermined value to one or more other frequency channels in which a BER does not reach the predetermined value, a second part of the traffic remaining on the one frequency channel of the one or more frequency channels, and a reduction controller to perform, for the second part of the traffic remaining on the one frequency channel of the one or more frequency channels after the transfer controller transfers the first part of traffic of the one frequency channel of the one or more frequency channels in which a BER reaches the predetermined value, reduction control to reduce at least one of a multi-level number of multi-level modulation or a coding rate.

2. The wireless communication system according to claim 1, wherein the reception device includes a BER detector to detect a BER of each of a plurality of frequency channels, and a transmitter to transmit the BER detected by the BER detector to the transmission device, the transmission device includes a receiver to receive the BER transmitted by the transmitter, and the transfer controller performs the transfer control based on the BER received by the receiver.

3. The wireless communication system according to claim 1, wherein the reception device includes a carrier-to-noise (CN) ratio detector to detect a CN ratio of each of a plurality of frequency channels, and a transmitter to transmit the CN ratio detected by the CN ratio detector to the transmission device, the transmission device includes a receiver to receive the CN ratio transmitted by the transmitter, and the reduction controller performs the reduction control based on the CN ratio received by the receiver.

4. The wireless communication system according to claim 3, wherein the transfer controller performs control to cancel the transfer control in a case where the CN ratio received by the receiver returns from a value lower than a predetermined value to a value equal to or higher than the predetermined value, and the reduction controller performs control to cancel the reduction control in a case where the CN ratio received by the receiver returns from a value lower than the predetermined value to a value equal to or higher than the predetermined value.

5. A wireless communication method that transmits data from a transmission device to a reception device by using a plurality of frequency channels, the method comprising:

performing transfer control to transfer only a first part of traffic on one frequency channel of one or more frequency channels in which a bit error rate (BER) reaches a predetermined value to one or more other frequency channels in which a BER does not reach the predetermined value, a second part of the traffic remaining on the one frequency channel of the one or more frequency channels; and performing, for the second part of the traffic remaining on the one frequency channel of the one or more frequency channels after the first part of traffic of the one frequency channel of the one or more frequency channels in which a BER reaches the predetermined value is transferred, reduction control to reduce at least one of a multi-level number of multi-level modulation or a coding rate.

6. A wireless device that transmits data by using a plurality of frequency channels, the wireless device comprising:

a transfer controller that performs transfer control to transfer only a first part of traffic on one frequency channel of one or more frequency channels in which a bit error rate (BER) reaches a predetermined value to one or more other frequency channels in which a BER does not reach the predetermined value, a second part of the traffic remaining on the one frequency channel of the one or more frequency channels; and a reduction controller that performs, for the second part of the traffic remaining on the one frequency channel of the one or more frequency channels after the transfer controller transfers the first part of traffic of the one frequency channel of the one or more frequency channels in which a BER reaches the predetermined value, reduction control to reduce at least one of a multi-level number of multi-level modulation or a coding rate.

7. The wireless device according to claim 6, further comprising:

a receiver to receive a BER of each of a plurality of frequency channels from another wireless device, wherein the transfer controller performs the transfer control based on the BER received by the receiver.

8. The wireless device according to claim 6, further comprising:

a receiver to receive a carrier-to-noise (CN) ratio of each of a plurality of frequency channels from another wireless device, wherein the reduction controller performs the reduction control based on the CN ratio received by the receiver.

* * * * *